(No Model.)
J. A. ROSE.
SAND BOX.
No. 562,918. Patented June 30, 1896.
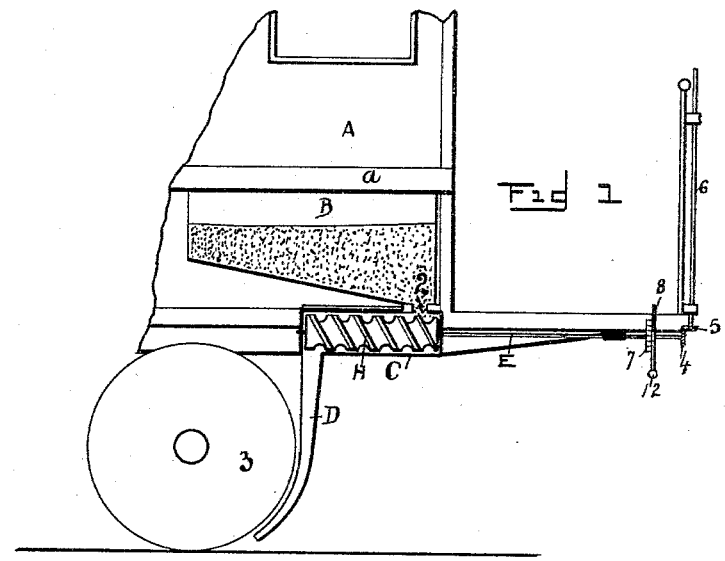
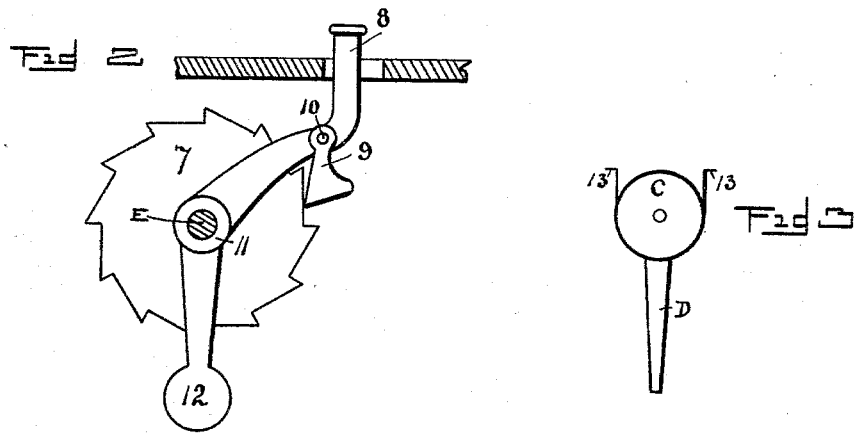
WITNESSES:
G. P. Bohrer.
E. R. Edwards.
Jacob A. Rose
INVENTOR
BY C. W. Sees
ATTORNEY.

United States Patent Office.

JACOB A. ROSE, OF OMAHA, NEBRASKA, ASSIGNOR OF ONE-HALF TO CLYDE BACKUS, OF SAME PLACE.

SAND-BOX.

SPECIFICATION forming part of Letters Patent No. 562,918, dated June 30, 1896.

Application filed July 12, 1895. Serial No. 555,799. (No model.)

*To all whom it may concern:*

Be it known that I, JACOB A. ROSE, residing at Omaha, in the county of Douglas and State of Nebraska, have invented certain useful Improvements in Sand-Boxes; and I do hereby declare that the following is a full, clear, and exact description of the invention, such as will enable others skilled in the art to which it appertains to make and use the same, reference being had to the accompanying drawings, which form a part of this specification.

This invention has relation to a new and novel improvement in sand-boxes adapted more particularly to be used in connection with street-cars.

The object of my invention is to provide a positive-feed sand-box, which will be described more fully hereainfter.

In the accompanying drawings, Figure 1 shows a broken end view of a car provided with my improved sand-box. Fig. 2 shows a detached detail of the force-feed mechanism, while Fig. 3 shows an end view of the sand-box and connected spout.

A represents a broken end view of an ordinary steet-car provided with the usual supporting-wheel 3 and seat $a$. Below this seat $a$ is an ordinary sand box or reservoir B of any suitable size and material, which is provided at one point with a feed-opening 2. Positioned below the sand-box B and communicating with the feed-opening 2 is an ordinary preferably cylindrical casing C, which is provided at the end opposite the feed-opening with a spout D, terminating in front of the wheel 3. Working within this casing C is a feed-spiral H, which is mounted upon a shaft E, and extends the full length of said casing C. This shaft E is given suitable support and in front is provided with a bevel-gear 4, meshing with the gear 5 upon the rod 6, which rod is adapted to be actuated by a suitable crank. This shaft E is further provided with a ratchet-wheel 7, as shown in Fig. 2, and a gravity-actuating crank-arm 8, provided with the counterbalance 12. This crank 8 is loosely mounted upon shaft E, and provided with a swinging gravity-actuating dog 9, secured by means of the pin 10 to the crank-arm 8. This dog is adapted to ride upon and against a ratchet-wheel 7, and when properly positioned extends a suitable distance above the platform of the car, as is shown in Fig. 1.

The operation of my device would be accomplished by revolving the bar 6 to revolve the shaft E, or the operator could depress the projecting end of the crank 8 to feed down the dog 9, which dog would engage one of the ratchet-teeth 7, and so revolve the shaft E. When the arm 8 is released, the counterbalance 12 would return the dog to its upper proper position, the dog 9 readily passing over the teeth by virtue of its pivot movement.

Now, having thus described my said invention, what I claim as new, and desire to secure by United States Letters Patent, is—

In a sand-box the combination of a reservoir provided with a feed-opening a cylindrical casing positioned below the sand-box and communicating with said feed-opening said casing being provided with a spout a feed-spiral within said casing a shaft supporting said spiral and extending the full length of said casing a gear upon said shaft an actuating-gear meshing with said shaft-gear, said shaft-gear being further provided with a ratchet-wheel and a gravity-actuating pawl-arm provided with a pawl and adapted to actuate said ratchet, all substantially as and for the purpose set forth.

In testimony whereof I affix my signature in presence of two witnesses.

JACOB A. ROSE.

Witnesses:
 ELMER G. STARR,
 G. W. SUES.